March 15, 1960
O. W. HOSKING
2,928,449
TUBELESS TIRE VALVE
Filed Dec. 30, 1955
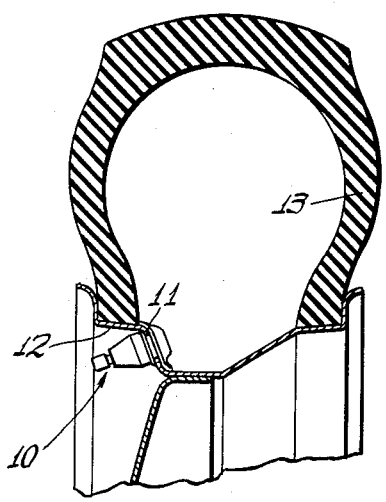
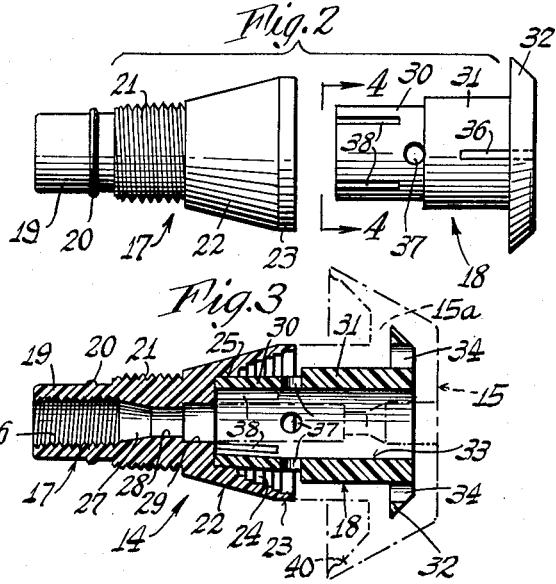
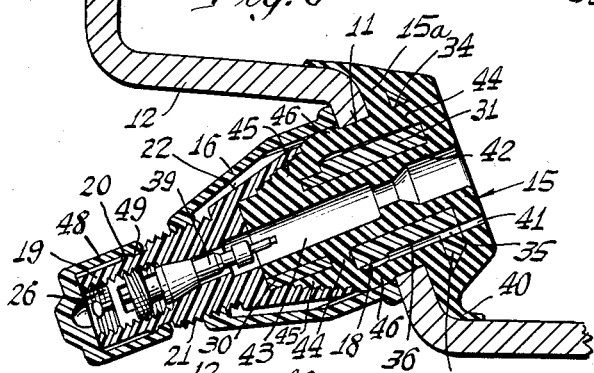
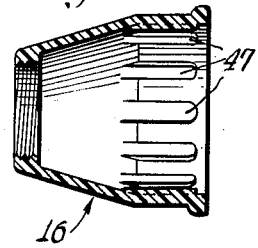
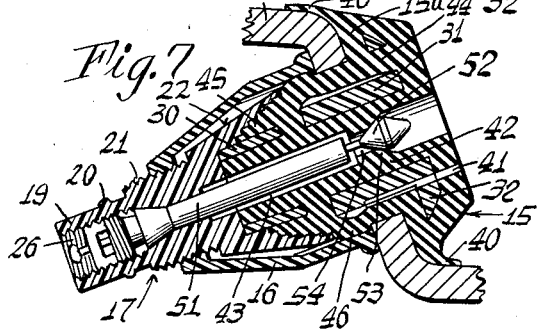
INVENTOR.
Oakley W. Hosking
BY
Johnson and Kline
ATTORNEYS

United States Patent Office 2,928,449
Patented Mar. 15, 1960

2,928,449

TUBELESS TIRE VALVE

Oakley W. Hosking, Monroe, N.Y.

Application December 30, 1955, Serial No. 556,612

17 Claims. (Cl. 152—427)

The invention relates to a valve stem and more particularly to a valve stem composed of a rigid stem insert and a resilient body suitable for use in tubeless tires.

An object of this invention is to provide a valve stem composed of a rigid stem insert which has molded thereon a resilient body of a vulcanizable substance in which the parts are held in non-movable relationship only by mechanical interconnections, rather than adhesively and in which the nonadhesive interconnection is utilized to effectively seal the two parts together by the fluid pressure in the tire.

Another object of this invention is to provide a valve stem of the above-disclosed type in which the rigid stem insert is formed from a moldable material, preferably plastic, which retains its shape at the vulcanizing temperature of the body material and in which at ambient temperatures is rigid, yet sufficiently resilient to withstand normally encountered shocks or blows.

A further object of this invention is to provide an improved composite valve stem for use in a tubeless tire wherein the valve stem projects through an aperture in the tire rim in a fluid tight manner, which is extremely simple in its construction, economical to fabricate, while at the same time being durable, corrosion resistant and able to withstand rough usage.

In accomplishing the above objects there is provided, according to the present invention, a novel valve stem structure comprising a rigid tubular member formed of a molded plastic and having a portion thereof encased by a resilient body member. The rigid stem insert is tubular and is interiorly threaded on an exposed end portion for maintaining a check valve in the bore. The other end of the insert is provided with an integral flange which is encased by the body member somewhat larger than the aperture in the rim to prevent the valve from being blown out of the rim. Contiguous with the flange, the stem is provided with a tubular section, also encased by the body member, and a portion of said section is disposed within the aperture of the rim. Air pressure is admitted thereto by means of a passageway in the flange and body member to balloon the portion of the body member adjacent the exterior surface thereof, away from the surface and into fluid sealing relation with the sides of the aperture. A retaining sleeve is positioned on the outside of the aperture for preventing inward movement of the valve stem and also to limit the deformation of the adjacent body portions, the body portions when ballooned, locking the sleeve in place.

In order to prevent leakage between the stem insert and body member there is disclosed in the present embodiment an annular wedge-shaped cavity flaring towards the flange and which is filled with portions of the body member. Fluid pressure in the tire causes the body portions in the cavity to more tightly wedge themselves therein for effectuating a fluid tight seal between the mating surfaces of the insert and body member.

According to the present invention another feature is the provision of radial and axial apertures, the former being in the bore part of the stem and the latter in the annular flange to provide a secure interlock between the resilient body and the rigid stem insert. Accordingly, dependence is not had on a bond being established between the body and the rigid insert to secure the parts together but instead these parts are maintained together by virtue of their specific shapes and interlocking engagement.

Other features and advantages will hereinafter appear.

In the accompanying drawings:

Figure 1 is a fragmentary transverse sectional view of a tubeless tire and wheel rim employing the tubeless tire valve of the present invention.

Fig. 2 is an exploded perspective view of the rigid insert of the tube.

Fig. 3 is a cross-section of the insert.

Fig. 4 is a view taken on the line 4—4 of Fig. 2.

Fig. 5 is a cross-section of the retaining sleeve of the present invention.

Fig. 6 is an axial section of the tubeless tire valve showing the position of the part when the valve is under pressure.

Fig. 7 is a view similar to Fig. 6 except that the valve stem is provided with a different type check valve.

The present invention is illustrated in connection with a check valve for controlling the entrance and exit of air in a tubeless tire, of the type generally used on automobiles. As shown in Fig. 1, the tubeless tire valve of the present invention, generally indicated by the reference numeral 10, is mounted in an aperture or opening 11 in the rim 12 on which the tubeless tire 13 is mounted and controls the inflation of the tire. In the illustrated form of the invention the novel valve stem comprises a rigid stem insert 14 having molded thereon a resilient body 15 and a retaining sleeve 16.

The rigid stem insert 14 is tubular and is composed preferably of two portions, a valve-containing or generally exposed part 17 and a substantially body-encased or base part 18. The exposed part 17 is annular in radial cross-sections and has a cylindrical peripheral surface 19 provided with a bead 20. Adjacent the surface 19 there is a threaded surface 21 merging into a frustro-conical exterior surface 22. An annular end surface 23 is formed adjacent the end of the frustro-conical surface. On the interior surface of the valve-containing part 17 there is preferably formed a series of ridges 24 of decreasing diameter opposite a portion of the frustro-conical surface 22 and an interior cylindrical surface 25 adjacent thereto. Inwardly of the cylindrical portion 19 is a threaded interior portion 26 flowing into an interior frustro-conical surface 27. A multi-diameter channel formed by surfaces 28 and 29 interconnects the surface 27 and the cylindrical surface 25 respectively.

The covered part 18 is substantially tubular and formed with annular portions 30 and 31, the latter being of larger exterior diameter. A circular anchoring flange 32 is provided on the other end of the portion 31, while bore 33 extends through the covered part 18. The anchoring flange 32 has formed therein equispaced apertures 34, aligned axially to the bore 33. In addition thereto, an air hole 35 is formed in the flange 32 and communicates with a groove 36 on the exterior surface of the annular portion 31 for a purpose to be later described. Radial openings 37 are formed in the portion of the annular portion 30 and these are preferably equispaced about the peripheral surface. The other end of the annular portion 30 has axially extending slots 38 formed therein.

The two parts are secured together with the slotted portion of the part 18 interfitting in the interior cylindrical surface 25 and preferably some type of adhesive or solvent is employed on the contacting surfaces to secure the parts together to form the rigid stem insert shown in Fig. 3. An annular wedge-shaped cavity is formed between the series of ridges 24 and the cylindrical surface of the portion 30, this wedge-shaped cavity flares outwardly towards the flange 32.

After the insert 14 has been fabricated as above it is placed in a suitable mold and the body member 15 molded about it to form the tire valve shown in Figs. 6 and 7. In the molding process, uncured rubber is placed in the mold containing the insert 14 and vulcanizing the rubber necessitates maintaining a temperature in the mold of 300° to 350°.

In accordance with the present invention the rigid stem insert is formed from a plastic material which retains its dimensional stability at the vulcanizing temperature of the rubber. In addition thereto, such plastic must be rigid, yet yieldable, to shocks and blows of the type as would be normally encountered in an automobile tire without deformation or cracking. It has been found that a synthetic plastic such as a polymeric amide satisfies the above requirements and such an amide is commonly known as "Nylon". In addition to the above cited properties, it is essential that the plastic material must have the property of being nonadhesive to the rubber body.

The rubber portion of the tubeless tire valve is preferably formed from a "Neoprene" GRS elastomer, though other rubbers which have the property of being nonadhering to the plastic material may be employed. After vulcanizing, such material must have sufficient stiffness to retain its shape, yet is readily deformable by pressures normally encountered in an automobile tire to effectuate a fluid tight seal.

In Fig. 6 there is shown the tire valve composed of the rubber body and plastic insert positioned in the aperture 11 of the tire rim 12 and subjected to fluid pressure. The tire valve is formed by positioning the insert 14 in a suitably shaped mold, filling the rest of the mold with unvulcanized or semi-vulcanized rubber-like material and then vulcanizing the material. Accordingly, an inner body portion 15a, within which the flange 32 is imbedded, is formed and has an annular lip 40 for engagement with the inside surface of the rim. In addition, portions of the body member 44 occupy the apertures 34 and the apertures 37 and thus serve to only mechanically interconnect the parts. At the same time the rubber flows through the slots 38 and unites with the tubular portion 42 to anchor the end of the latter to the body portion 45 against being stripped out when the molding core is withdrawn. The body portion moreover, has a tubular portion 42 covering the bore 33 which also forms the bore 43. Another portion 45 occupies an annular wedge-shaped cavity and has an annular portion 46 exposed on the outside of the valve stem adjacent the rim.

A suitable valve core such as the core 39, Fig. 6, is screwed into the threaded neck 19. This can be done either before or after the valve is mounted in the rim 12. The valve is located in the rim by extending the threaded portion of the insert from the inside through to the outside of the aperture 11 until the inner body portion 15a abuts the tire rim to stop further outward movement. Prior to admission of any air the retaining sleeve 16 is screwed on the threaded portion 21 until it abuts the outer surface of the rim surrounding the aperture. It will be apparent that the retaining sleeve 16 and anchoring flange 32 provide a mechanical lock for the valve to prevent any displacement thereof. The position of the retaining sleeve 16 on the valve stem initially deforms the annular lip 40 to the surface of the rim adjacent thereto.

According to the present invention wherein there is no adherence or bonding, between the plastic stem 14 and the rubber body 15, as is commonly employed to prevent escape of air through a valve, the air pressure in the tire itself is utilized to seal the stem against leakage both between the plastic insert 14 and the rubber body 15 and between the rim 12 and the rubber body 15. Accordingly, after the introduction of pressure into the tire the annular lip 40 is pressed into a more sealing relationship with the rim. A passageway 41 formed in the rubber body during the vulcanizing operation communicates with the air hole 35 and the groove 36 to permit air pressure to be introduced between the rubber body 15 and the rubber-encased part 18 on the exterior of the annular portion 31. This pressure deforms the rubber material so that it bulges against the sides of the aperture 11 and retaining sleeve 16 to form a substantially fluid tight seal. Furthermore, the rubber body portion 45 is pressed against the series of ridges 24 to prevent leakage therethrough by the fluid pressure in the passageway 41 exerting a force in an axial direction toward the ridges 24.

As shown in Fig. 5, the retaining sleeve 16 has series of protrusions 47 extending axially. Upon deformation of the portion 46, an exceedingly positive frictional lock is caused between the portions 46 and the sleeve 16 to effectively prevent any loosening of the sleeve.

It has been found that if the valve stem on its exposed end were provided with threads to accommodate the conventional screw sealing cap that the end would be so materially weakened thereby as to render the valve inoperative for the purpose intended. Accordingly, instead of utilizing a screw cap, a cap 48 formed of plastic material that is somewhat stiff, yet deformable under the fluid pressure normally encountered in the tire, is employed. The cap 48 has a bead 49 which slips over the bead 20, and any air leaking past the valve 39 causes the cap 48 to balloon outwardly which in turn causes a tighter engagement of the beads 20 and 49 to prevent any leakage of fluid therepast. As shown, the threaded portion 21 for the sleeve 17 is axially displaced from the threaded portion 26 for the check valve to prevent having radially aligned threads on the stem and consequent weakening thereof.

Shown in Fig. 7 is the valve stem of the present invention but in which a different type of check valve is employed. The valve core 51 supports a conical valve 52 which mates with a frustro-conical valve seat portion 53 formed in the portion 42 of the body member 15 to form a fluid tight seal. It will be apparent in this construction that after the valve 52 has been forced past a restricted aperture 54 in the bore 43, that fluid pressure in the tire is exerted thereon to force the valve 52 into a tighter fluid tight seal with the seat 53. However, since the passageway 41 is in direct communication with the inflated tire the sealing effect caused by the admittance of air into this passageway is not affected by this type of check valve.

Variations and modifications may be made within the scope of the claims and portions of the improvements may be used without others.

I claim:

1. A valve for positioning within an aperture formed in an inflexible member of an inflatable device to control the fluid pressure therein comprising a body member formed of a resilient material; a substantially rigid incompressible stem formed to provide a bore extending therethrough provided with means for retaining a valve core therein and having a portion encased by said body member with the remaining portion of the stem projecting therefrom, said encased portion having a tubular section adapted to be disposed in the aperture; and in which said rigid stem is formed of a plastic material which is free from the body member except for mechanically interlocking portions of the stem and body member whereby the body member is adapted to be deformed by the fluid pressure away from the tubular section and into a tight seal with the sides of the aperture.

2. A tire valve for positioning within an aperture formed in an inflexible member of an inflatable device to control the fluid pressure therein comprising a body member formed of a resilient material including an end annular portion adapted to be positioned within the inflatable device; a substantially rigid incompressible stem having a portion encased by said body member with the remaining portion of the stem projecting therefrom, said encased portion having a covered tubular section adapted to be disposed in the aperture; said body member being formed with a passageway commencing in and passing through the end annular portion and adapted to connect the exterior of the tubular section to the interior of the inflatable member; and in which said rigid stem is formed of a plastic material which is free from the body member except for mechanically interlocking portions of the stem and body member whereby the body member is adapted to be deformed by the fluid pressure away from the tubular section and into a tight seal with the sides of the aperture by the flow of fluid from the inflatable device passing through the passageway.

3. A valve for positioning within an aperture formed in an inflexible member of an inflatable device to control the fluid pressure therein comprising a body member formed of a resilient material; a substantially rigid stem having a portion encased by said body member with the remaining portion projecting therefrom, said encased portion having a tubular section adapted to be disposed in the aperture; in which said rigid stem is formed of a plastic material which is only mechanically connected to the body member whereby the body member is adapted to be deformed by the fluid pressure away from the tubular section and into a tight seal with the sides of the apertures; in which the encased portion is provided with an integral flange of a size larger than the aperture; and in which said flange is provided with holes filled by portions of the body member to secure the stem and body together.

4. A valve for positioning within an aperture formed in an inflexible member of an inflatable device to control the fluid pressure therein comprising a body member formed of a resilient material; a substantially rigid stem having a portion encased by said body member with the remaining portion projecting therefrom, said encased portion having a tubular section adapted to be disposed in the aperture; in which said rigid stem is formed of a plastic material which is only mechanically connected to the body member whereby the body member is adapted to be deformed by the fluid pressure away from the tubular section and into a tight seal with the sides of the apertures; in which the stem has an annular wedge-shaped cavity filled by portions of the body member; and in which the portions are adapted to be caused to wedge themselves more tightly into the cavity by the pressure in the inflatable device to cause a fluid tight seal.

5. The invention as defined in claim 4 in which the first surface of the wedge-shaped cavity constitutes part of the exposed portion of the stem and a second surface constitutes part of the encased portion; and in which, when the valve is positioned within the rim aperture, the first surface flares outwardly toward the aperture.

6. A tire valve for positioning within an aperture formed in an inflexible member of an inflatable device to control the fluid pressure therein comprising a body member formed of a resilient material; a substantially rigid stem having a portion encased by said body member with the remaining portion projecting therefrom, said encased portion having a tubular section adapted to be disposed in the aperture; and in which the stem has a portion, when the valve is positioned within the rim aperture, flaring outwardly toward the aperture and a cylindrical portion underneath to form an annular wedge-shaped cavity filled by portions of said body member, said flared out portion having corrugations therein for increasing the effective area thereof.

7. The invention as defined in claim 6 in which the corrugations are in the form of a series of annular rings having increasing diameters.

8. A tire valve for positioning within an aperture formed in an inflexible member of an inflatable device to control the fluid pressure therein comprising a body member formed of a resilient material; a substantially rigid stem having a portion encased by said body member with the remaining portion projecting therefrom, said encased portion having a covered tubular section adapted to be disposed in the aperture; said body member being formed with a passageway adapted to connect the exterior of the tubular section to the interior of the inflatable member; in which said rigid stem is formed of a plastic material which is only mechanically connected to the body member whereby the body member is adapted to be deformed by the fluid pressure away from the tubular section and into a tight seal with the sides of the aperture; and in which the encased portion contains an integral flange of a size larger than the aperture; and a substantially rigid retaining means movably attached to the stem and adapted for movement toward the flange for securing the valve stem in position on the rim.

9. The invention as defined in claim 8 in which the retaining means contacts portions of the body member to limit the deformation thereof.

10. The invention as defined in claim 8 in which the retaining means is also formed of a plastic material and has protrusions aligned with the direction of movement for engaging portions of the body member in order to more securely hold the retaining means in position when the body member is deformed.

11. A stem insert adapted to have molded on a portion thereof a resilient body member of vulcanizable material, said stem insert comprising a tubular member formed of a plastic material which is substantially rigid at ambient temperatures, and adapted to retain its shape at the vulcanizing temperature of the body member and be non-adhesive to the body member, said member being formed with a frustro-conical portion overlapping a substantially cylindrical portion to form a wedge-shaped cavity opening toward one end of the member; and an annular flange formed on the said one end and having apertures therein whereby to effectuate only a mechanical connection between the stem and the body member.

12. The invention as defined in claim 11 in which the cylindrical portion has apertures radially aligned with the frustro-conical portion for anchoring the body member to the insert in the vicinity of the wedge-shaped cavity.

13. The invention as defined in claim 11 in which the interior of the other end of the tube has a threaded portion and axially displaced therefrom is an exterior threaded portion whereby weakening of the tube by the threaded portions is prevented.

14. The invention as defined in claim 13 in which the exterior surface of the inwardly threaded portion of the member is cylindrical and is provided with an annular rib for maintaining thereon a resilent cap having a cooperating rib.

15. The invention as defined in claim 11 in which the tube is formed of two distinct elements adhesively secured together adjacent the wedge-shaped cavity.

16. A tire valve for positioning within an aperture formed in an inflexible member of an inflatable device to control the fluid pressure therein comprising a body member formed of a resilient material; a substantially rigid stem having a portion encased by said body member with the remaining portion projecting therefrom, said encased portion having a covered tubular section adapted to be disposed in the aperture; said body member being formed with a passageway adapted to connect the exterior of the tubular section to the interior of the inflatable member; in which said rigid stem is formed of a plastic material which is free from the body member except for mechanically interlocking portions of the stem and body member whereby the body member is adapted to be deformed by the fluid pressure away from the tubular section and into a tight seal with the sides of the aperture; and in which the plastic material is a polymeric amide and the resilient body material is a synthetic rubber compound.

17. A stem insert adapted to have molded on a portion thereof a resilient body member of vulcanizable material, said stem insert comprising a tubular member formed of a plastic material which is substantially rigid at ambient temperatures, and adapted to retain its shape at the vulcanizing temperature of the body member and be nonadhesive to the body member, said tubular member being formed with a portion overlapping a substantially cylindrical portion to form a cavity, said cylindrical portion having radial slots elongate in the direction of the axis of the tubular member and formed in the overlapped portion of the cylindrical portion whereby said slots on becoming filled by portions of said body member unite the portions of the body member located in the cavity and on the interior of the cylindrical portion.

References Cited in the file of this patent
UNITED STATES PATENTS

| | | |
|---|---|---|
| 2,275,081 | Maynard | Mar. 3, 1942 |
| 2,634,785 | Tubbs | Apr. 14, 1953 |
| 2,798,530 | Nonnamaker | July 9, 1957 |